(12) United States Patent
Kaply et al.

(10) Patent No.: US 6,895,556 B1
(45) Date of Patent: May 17, 2005

(54) SYSTEM AND METHOD FOR PROVIDING ACCESS TO DISPLAYED DATA

(75) Inventors: Michael Aaron Kaply, Austin, TX (US); Jeffrey Allen Jones, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/439,049

(22) Filed: Nov. 12, 1999

(51) Int. Cl.[7] ................................................. G06T 5/00
(52) U.S. Cl. ...................... 715/741; 715/526; 345/619
(58) Field of Search ................................. 715/526, 741, 715/500, 511; 345/619, 714, 788, 531; 719/313, 318, 328

(56) References Cited

U.S. PATENT DOCUMENTS

| | | | |
|---|---|---|---|
| 5,390,335 A | | 2/1995 | Stephan et al. |
| 5,392,400 A | | 2/1995 | Berkowitz et al. |
| 5,432,931 A | | 7/1995 | Woess et al. |
| 5,519,862 A | | 5/1996 | Schaeffer et al. |
| 5,630,042 A | | 5/1997 | McIntosh et al. |
| 5,754,178 A | | 5/1998 | Johnston, Jr. et al. |
| 5,835,594 A | | 11/1998 | Albrecht et al. |
| 5,850,466 A | | 12/1998 | Schott |
| 5,864,666 A | | 1/1999 | Shrader |
| 5,881,287 A | * | 3/1999 | Mast ........................... 717/127 |
| 6,266,664 B1 | * | 7/2001 | Russell-Falla et al. ......... 707/5 |
| 6,389,472 B1 | * | 5/2002 | Hughes et al. .............. 709/229 |
| 6,421,733 B1 | * | 7/2002 | Tso et al. .................... 709/246 |
| 6,493,744 B1 | * | 12/2002 | Emens et al. ............... 709/203 |
| 6,501,472 B1 | * | 12/2002 | Hunt et al. .................. 345/428 |

FOREIGN PATENT DOCUMENTS

WO   WO 95/20291   7/1995

OTHER PUBLICATIONS

Resnick, Paul, "PICS, Censorship, and Intellectual Freedom FAQ," www.w3.org/PICS/PICS–FAQ–980126.html Aug. 4, 1999.*

Safdar, Shabbir J. and Cherry, Steven, "The Australian Internet Parental Control FAQ" www.efa.org.au/Campaigns/aipcfaq.html 1996.*

Use of Callback Routines in the Implementation of Open System Interconnection Management Standards. IBM Technical Disclosure Bulletin, vol. 39, No. 01, Jan. 1996.

* cited by examiner

*Primary Examiner*—Stephen Hong
*Assistant Examiner*—Matthew Ludwig
(74) *Attorney, Agent, or Firm*—Joseph C. Redmond, Jr.; Jeffrey S. LaBaw; Morgan & Finnegan, LLP (57) ABSTRACT

A system and method for providing access to displayed data by determining what data should be supplied to an application when the application attempts to access data that is either not present, or not authorized to be accessed. In order to carry out the method of the present invention, a request for data of a first process is received from a second process. At the first process, a resolution to the request for data received from the second process is generated and the generated resolution is transmitted from the first process to the second process. The step of generating the resolution may comprise the steps of: transmitting a request for additional information relating to the request for data from the first process to the second process, receiving a response to the request for additional information from the second process, and generating, at the first process, a resolution to the request for data received from the second process based on the response to the request for additional information received from the second process.

57 Claims, 11 Drawing Sheets

SYSTEM AND METHOD FOR PROVIDING ACCESS TO DISPLAYED DATA

FIELD OF THE INVENTION

The present invention relates to a method for providing access to displayed data, and a system implementing the method.

BACKGROUND OF THE INVENTION

Figure 1:
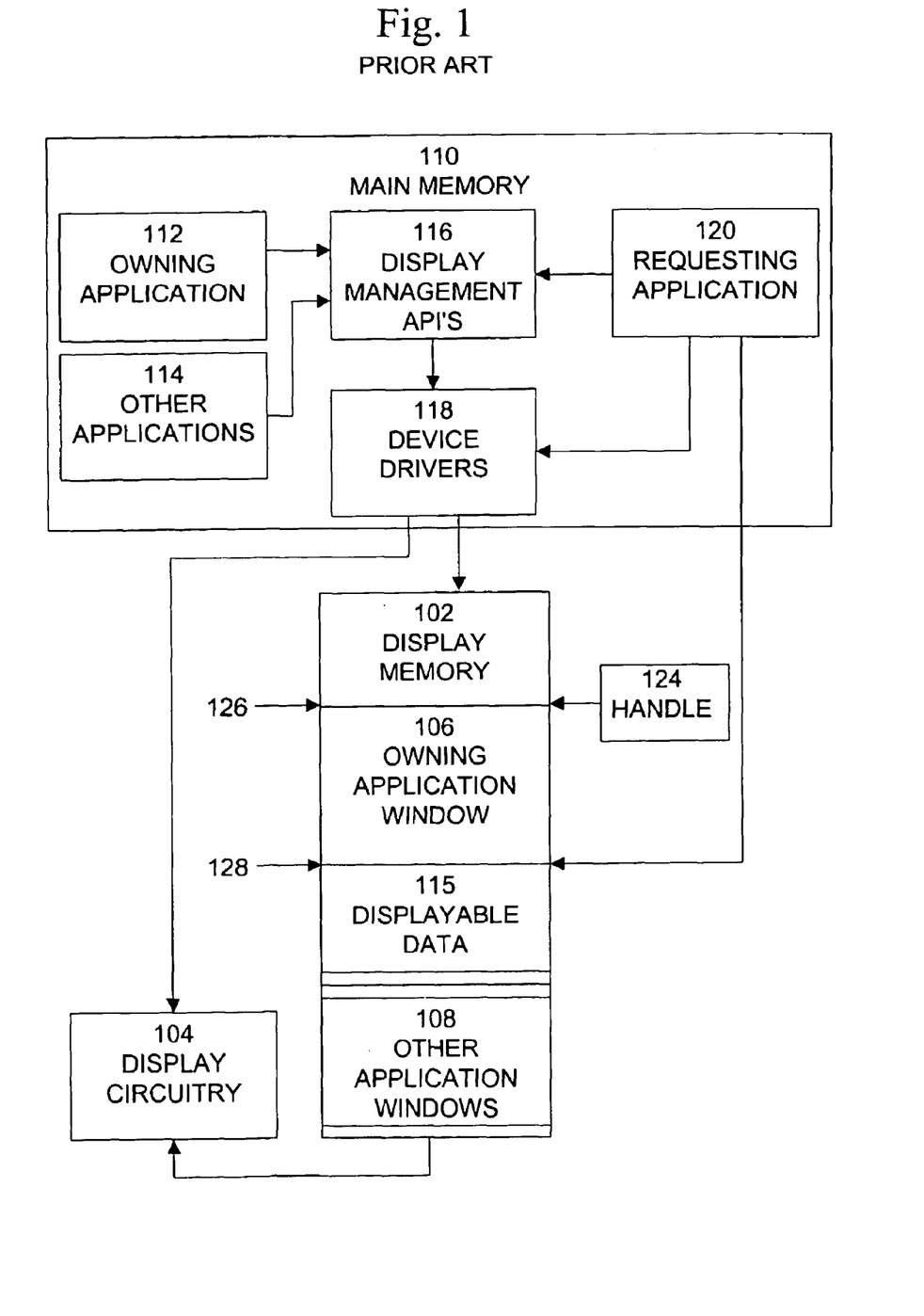
FIG. 1 is an exemplary block diagram of a prior art display system.

An exemplary prior art hardware/software display arrangement in a computer system is shown in FIG. 1. A display memory 102 is connected to display circuitry 104, which generates a display signal based on the contents of display memory 102. Display memory 102 contains data representing display windows controlled by various application programs, such as owning application window 106 and other application windows 108.

Also present in the computer system is main memory 10, which contains a variety of programs and routines that are executed by the computer system. Main memory contains owning application 112, other applications 114, display management application program interfaces (API's) 116, device drivers 118 and, in this example, requesting application 120. Although the term application is used in this document to refer to application 112 and other applications 114, one of skill in the art would recognize that the description herein is equally applicable to any executing process in a computer system.

Owning application 112 owns owning application window 106, while the other applications 114 own the other application windows 108. Owning application 112 may display data of any kind, such as text, images, video, etc., in owning application window 106, as well as other objects, such as control buttons, text entry boxes, sliders, etc. For example, owning application 112 may display data such as displayable data 115. In order to display data or other objects, owning application 112 communicates with display memory 102 through APIs 116, which provide a device-independent interface to the device-specific device drivers 118, which access and control the hardware of display memory 102 and display circuitry 104.

Another application, such as requesting application 120 may request access to the data displayed in application window 106. A problem arises when the requested data is unobtainable, such as may occur when the data is protected from access, when the data is in a format that is not compatible with the data request, or when the data simply does not exist, as may occur if a window is not actually visible. Currently, an error is generated and no data is returned.

A need arises for a technique that will determine what data should be supplied to an application when the application attempts to access data that is either not present, or not authorized to be accessed.

SUMMARY OF THE INVENTION

The present invention is a system and method for providing access to displayed data by determining what data should be supplied to an application when the application attempts to access data that is either not present, or not authorized to be accessed. In order to carry out the method of the present invention, a request for data of a first process is received from a second process. At the first process, a resolution to the request for data received from the second process is generated and the generated resolution is transmitted from the first process to the second process.

In one embodiment of the present invention the requested data is protected data and the received resolution comprises a modified version of the protected data. The modified version of the data may comprise data substituted for at least a portion of the protected data or data augmenting the protected data. The data substituted for at least a portion of the protected data may comprise a pattern or a message indicating where the protected data would have been displayed. The data augmenting the protected data may comprise a copyright notice.

In another embodiment of the present invention, the requested data is data that is not being displayed and the received resolution comprises the requested data.

In another embodiment of the present invention, the requested data does not exist and the received resolution comprises a generated version of the requested data.

In another embodiment of the present invention, the requesting step comprises the step of transmitting information relating to the request for data to the first process and wherein the received resolution is based on the information relating to the request for data. The information relating to the request for data may identify a process requesting the data and the received resolution may be based on the identified process or the information relating to the request for data may indicate a use to be made of the data and the received resolution may be based on the indicated use.

In another embodiment of the present invention, the requested data comprises image data. The received resolution may comprise image data having a different color depth than the requested data. The received resolution may comprise image data having a different pixel resolution than the requested data. The received resolution may comprise image data that is not the requested data.

In another embodiment of the present invention, the requested data may comprise an image of text displayed in a first font and the received resolution may comprise an image of the text displayed in a second font.

In another embodiment of the present invention, the step of generating the resolution comprises the steps of: transmitting a request for additional information relating to the request for data from the first process to the second process, receiving a response to the request for additional information from the second process, and generating, at the first process, a resolution to the request for data received from the second process based on the response to the request for additional information received from the second process. The received response to the request for additional information may comprise information identifying a process requesting the data. The received response to the request for additional information may comprise information indicating a use to be made of the data. The received response to the request for additional information may comprise information relating to attributes of the data.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

Figure 2A:
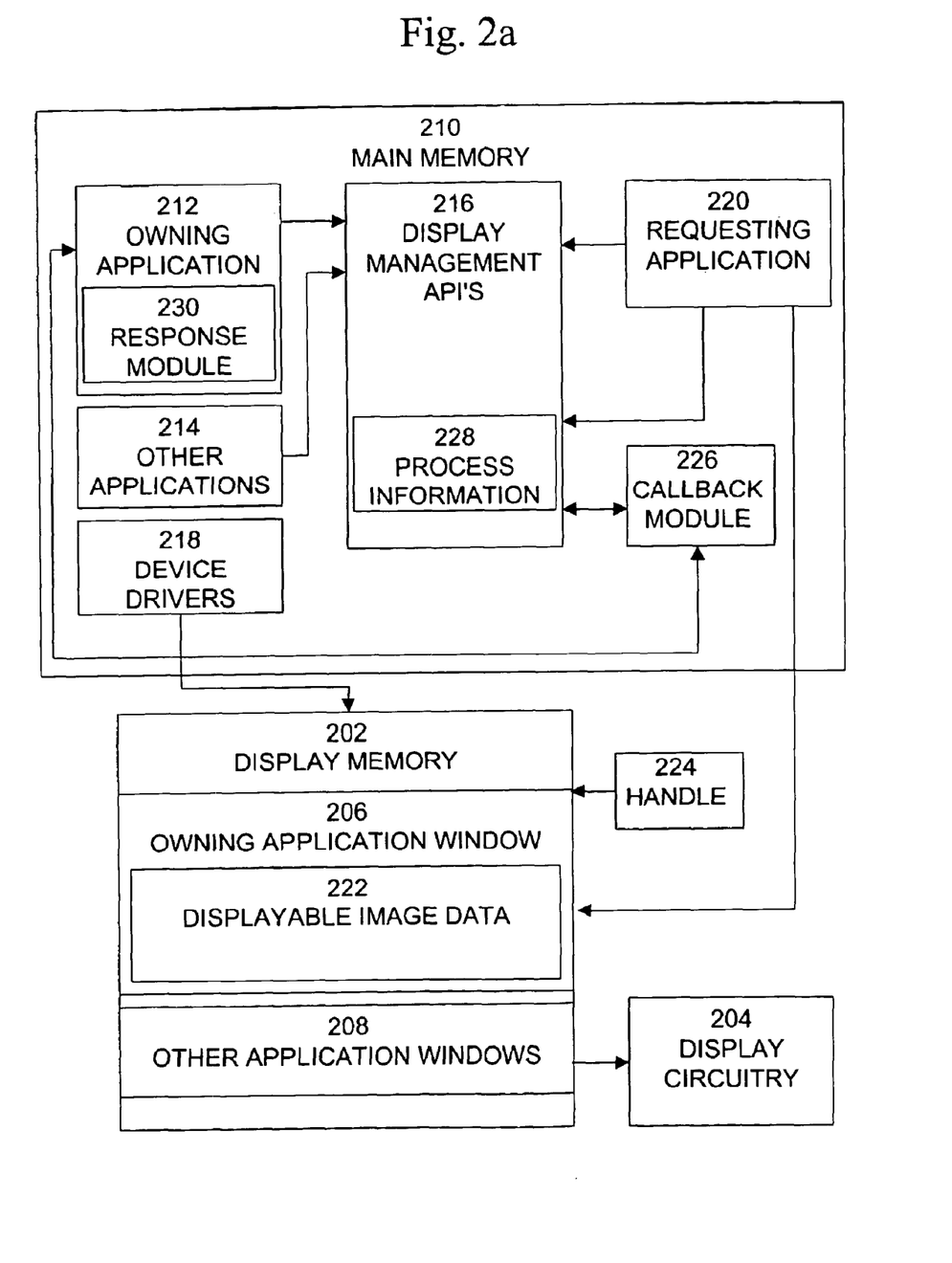
FIG. 2a is an exemplary block diagram of an embodiment of a display system, according to the present invention.
Figure 2B:
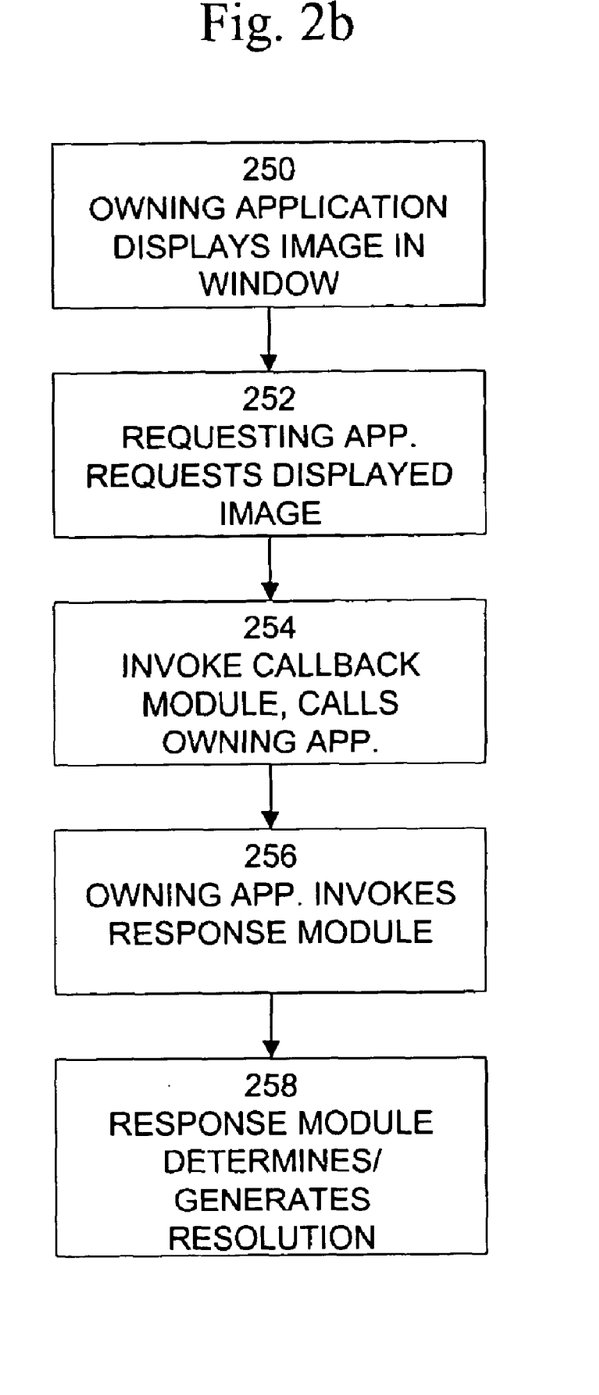
FIG. 2b is a flow diagram of a process which may be implemented in the system of FIG. 2b.

An exemplary hardware/software display arrangement in a computer system is shown in FIG. 2a, in which may be implemented the process shown in FIG. 2b. A display memory 202 is connected to display circuitry 204, which generates a display signal based on the contents of display memory 202. Display memory 202 contains data representing display windows owned by various application programs, such as owning application window 206 and other application windows 208.

Also present in the computer system is main memory 210, which contains a variety of programs and routines that are executed by the computer system. Main memory contains owning application 212, other applications 214, display management application program interfaces (API's) 216, device drivers 218 and, in this example, requesting application 220. Although the term application is used in this document to refer to owning application 212, other applications 214, and requesting application 220, one of skill in the art would recognize that the description herein is equally applicable to any executing process in a computer system.

Owning application 212 controls owning application window 206, while the other applications 214 control the other application windows 208. As shown in step 250 of FIG. 2b, owning application 212 displays displayable data 222 in owning application window 206, within display memory 202. In order to create displayable data 222, owning application 212 communicates with display memory 202 through API's 216, which provide a device-independent interface to the device-specific device drivers 218, which access and control the hardware of display memory 202 and display circuitry 204.

In step 252 of FIG. 2b, requesting application 220 requests access to displayable data 222. An application may attempt to access displayed data of another application in several ways. For example, requesting application 220 can access owning application window 206 through the display management API's 216 using handle 224, or by directly accessing the physical display memory 202. When an application attempts to access displayed data of another application, such attempted access is detected, and, in step 254 of FIG. 2b, callback module 226 is invoked. In the embodiment of the present invention shown in FIG. 2a, display management API's 216 use process information 228 to detect the attempted access. Process information 228 is information that associates each region of display memory 202 with a process that owns that region at the present time. Other mechanisms may be used to detect the attempted access. Depending upon the detection mechanism, the callback module may be invoked by calling a registered function (in the case where an API detects the attempted access), by an interrupt, page fault, or other hardware generated condition, etc.

In any case, in step 254 of FIG. 2b, the callback module 226 calls owning application 212 to request a resolution to the attempted access. Callback module 226 may pass information about the attempted access, such as the identity of requesting application 220, a desired format, etc., to owning application 212. In step 256 of FIG. 2, owning application 212 invokes response module 230, which, in step 258, determines what action to take and generates a resolution, examining the information about the attempted access if necessary.

Figure 3:
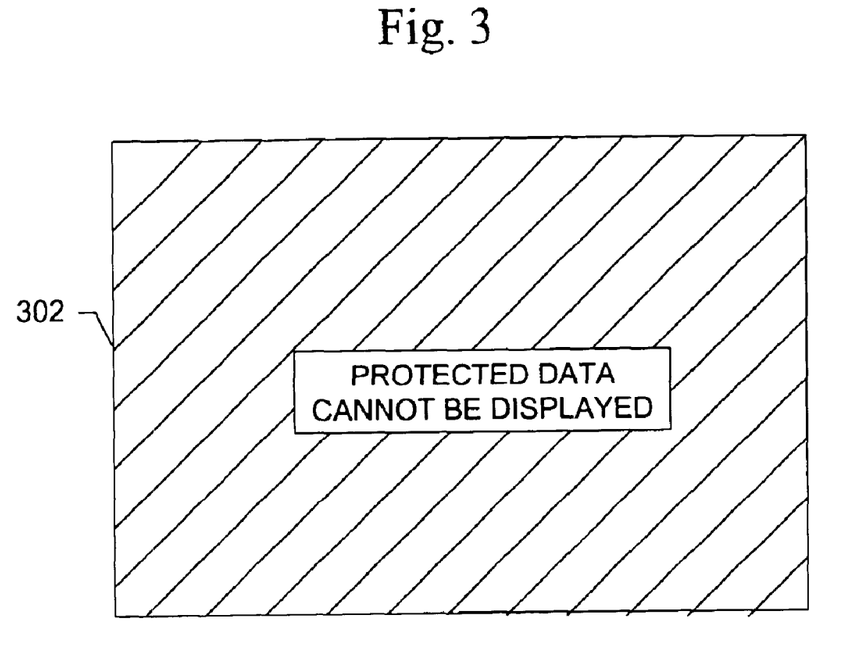
FIG. 3 is an exemplary screen display generated by one embodiment of the present invention.
Figure 4:
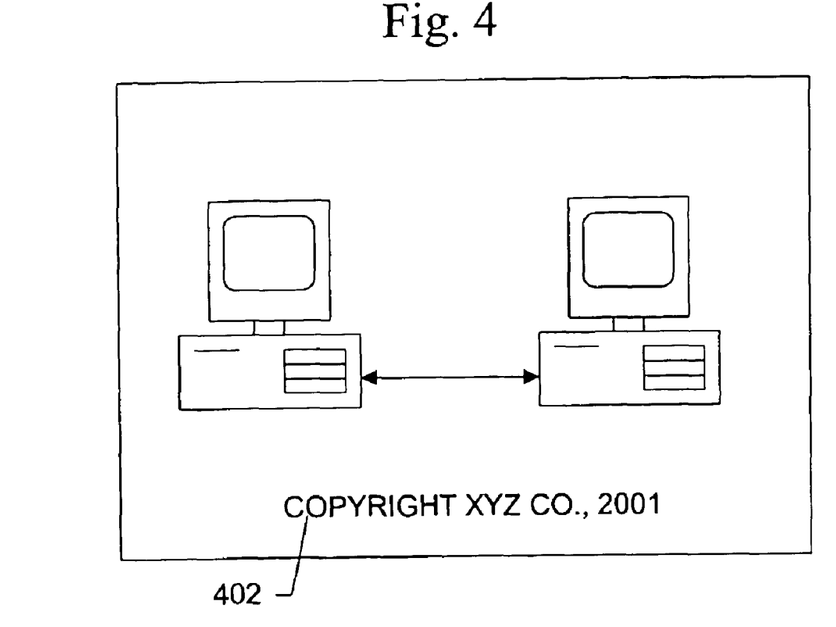
FIG. 4 is an exemplary screen display generated by one embodiment of the present invention.
Figure 5:
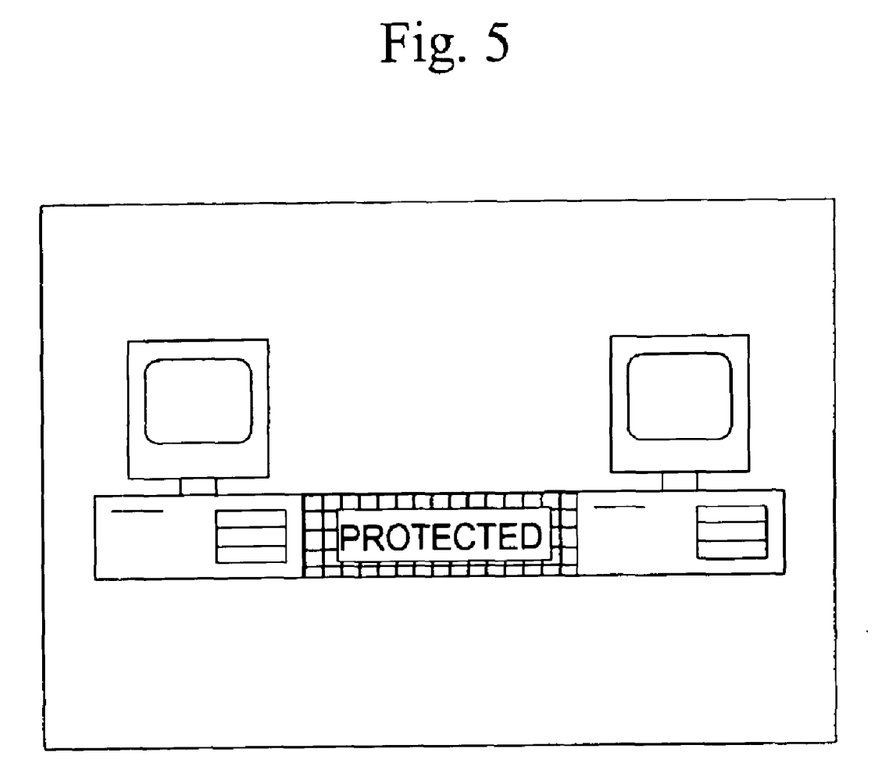
FIG. 5 is an exemplary screen display generated by one embodiment of the present invention.

The action determined and resolution generated by response module 230 may depend upon several factors, such as the type of data involved in the attempted access, the application attempting to access the data, etc. For example, if the data involved in the attempted access is protected, and the application attempting to access the data is not authorized to do so, then typically, response module 230 will generate a modified version of the protected data, which will be supplied to requesting application 220. For example, response module 230 may generate a pattern or a message, such as pattern 302, shown in FIG. 3, that would indicate where the protected data would have been displayed. Response module 230 may augment the protected data by, for example, adding a copyright notice 402, as shown in FIG. 4, or by blurring or obscuring some or all of the protected data, as shown in FIG. 5. In addition, several modifications may be applied simultaneously.

Figure 6:
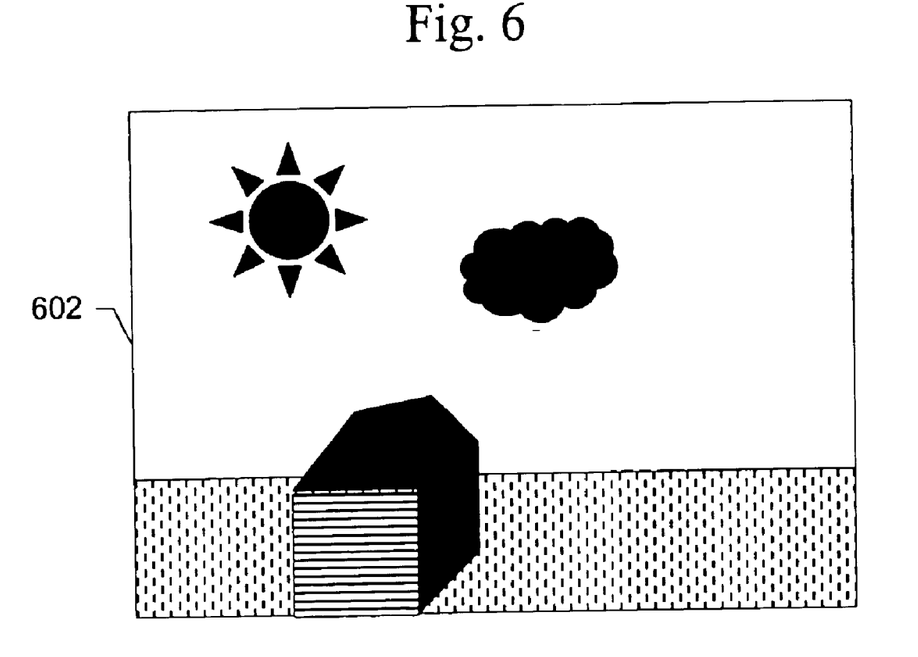
FIG. 6 is an exemplary screen display generated by one embodiment of the present invention.
Figure 7:
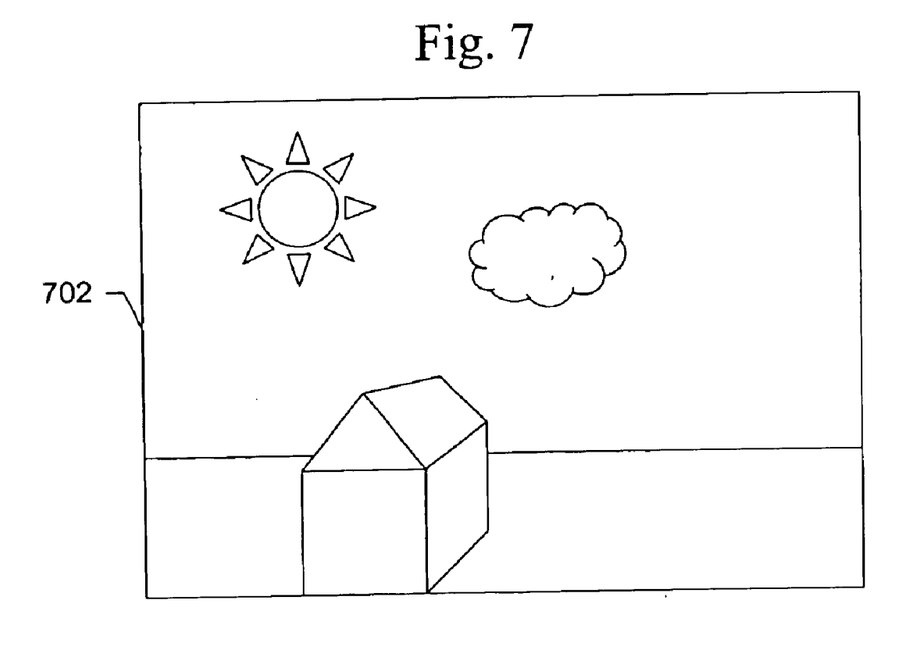
FIG. 7 is an exemplary screen display generated by one embodiment of the present invention.

Other situations may arise. The data involved in the attempted access may not be present in display memory 202. For example, the data may be off screen, or it may not have been generated yet. In this case, response module 230 may return the actual data, generating it if necessary. Response module 230 may generate different versions of the requested data depending upon the application that is requesting it. For example, the displayed data may be a color image, such as image 602, shown in FIG. 6. A requesting application may request a black and white image, in which case the response module would generate a black and white version of the requested image, such as image 702, shown in FIG. 7, and return the black and white image to the requesting application. Likewise, the requesting application may request a color version of a black and white image, in which case the owning application may provide the color version, if it is available, provide the black and white version in the requested color format, or may indicate that a color version of the image cannot be provided.

Figure 8:
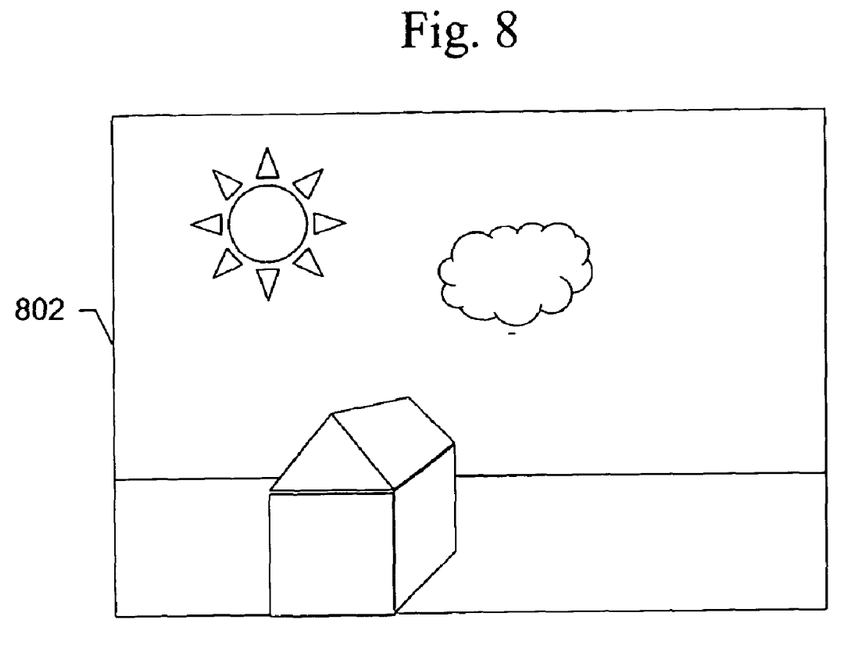
FIG. 8 is an exemplary screen display generated by one embodiment of the present invention.
Figure 9:
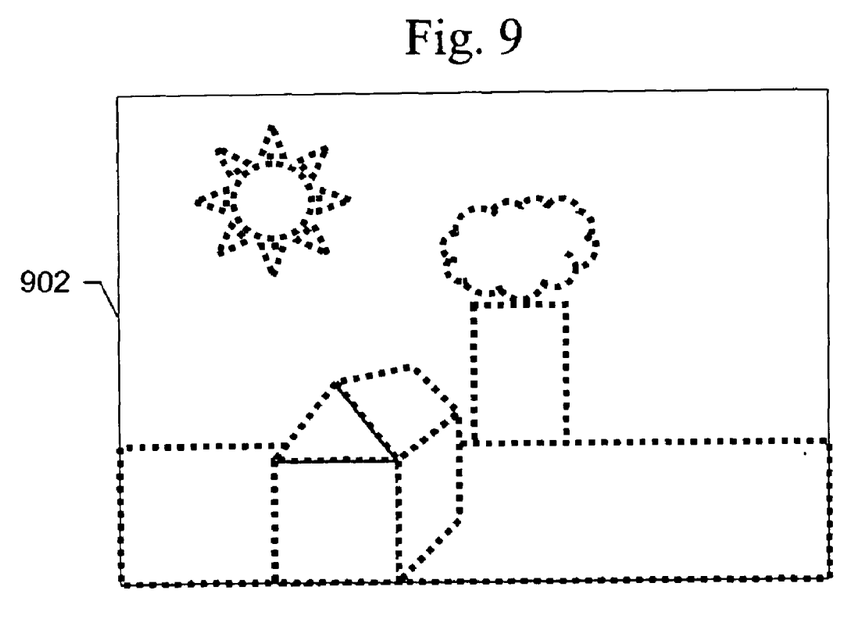
FIG. 9 is an exemplary screen display generated by one embodiment of the present invention.

Another example is shown in FIGS. 8 and 9. The displayed image 802, shown in FIG. 8, is a high pixel resolution image. The owning application may provide a lower pixel resolution image 902, shown in FIG. 9, to the requesting application, either in response to a request for a particular resolution or a lower pixel resolution image, or because the owning application does not wish to provide the higher pixel resolution image to the requesting application. This may be useful, for example, where higher pixel resolution images are used for display purposes, but only lower pixel resolution images are provided without payment of a fee. The present invention may also be used to provide images having higher resolution than the displayed image, or to provide images of various resolutions. For example, the information sent with the request for the image could include payment information and the response module could determine what resolution image to provide.

Figure 10:
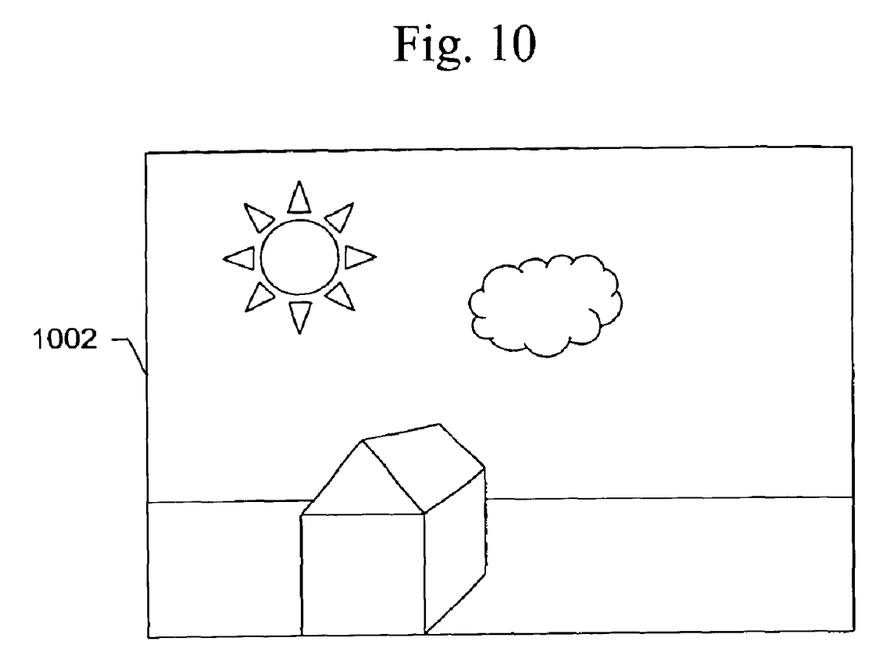
FIG. 10 is an exemplary screen display generated by one embodiment of the present invention.
Figure 11:
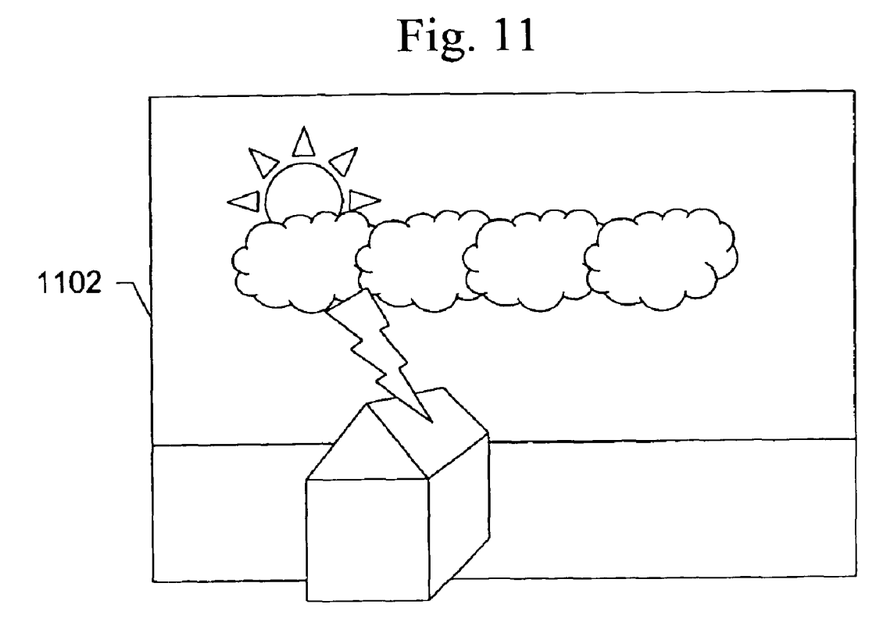
FIG. 11 is an exemplary screen display generated by one embodiment of the present invention.

Another example is shown in FIGS. 8 and 9. The displayed image 1002 is shown in FIG. 10. The owning application may provide a modified or even a different image 1102 to the requesting application.

Figure 12:
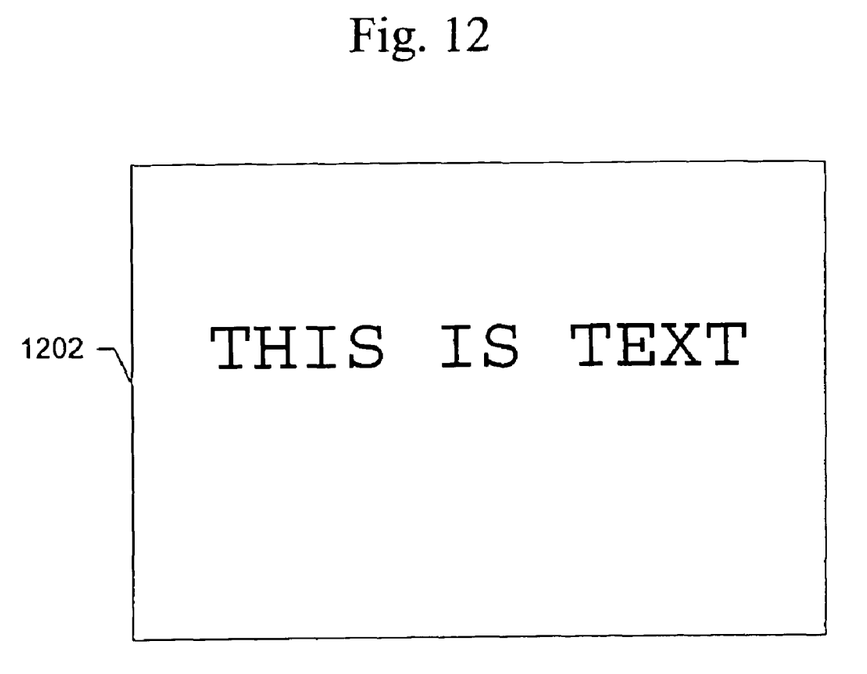
FIG. 12 is an exemplary screen display generated by one embodiment of the present invention.
Figure 13:
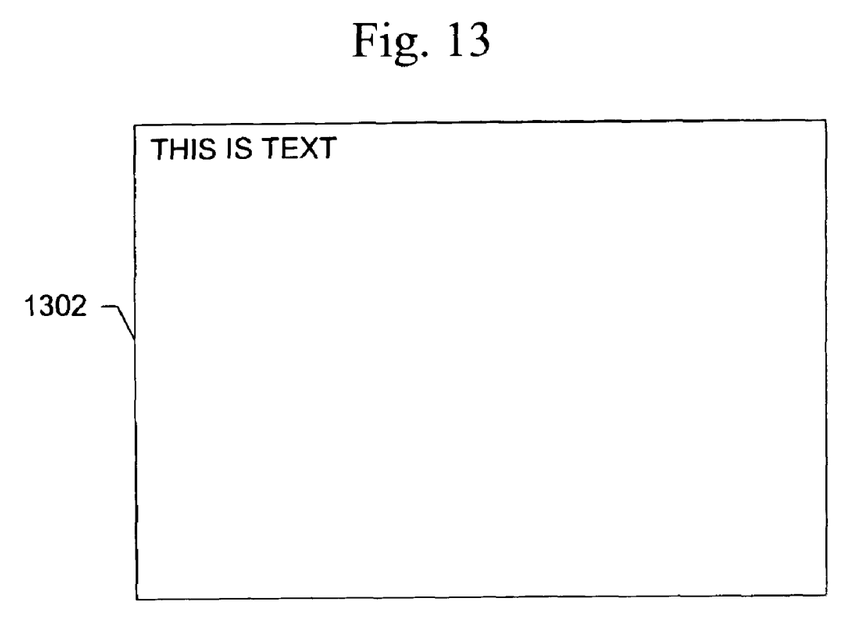
FIG. 13 is an exemplary screen display generated by one embodiment of the present invention.

Another example is shown in FIGS. 12 and 13. The displayed data 1202, shown in FIG. 12, includes text displayed in a font that is suitable for screen display, but which may not be suitable for other uses. The requested data in this example is not the text data, but is the data representing an image of the text. For example, if the requesting application will print the data including text, a higher resolution or anti-aliased version of the text may be desirable. Likewise, if the text is to be processed by optical character recognition (OCR) software, it may be desirable to provide a version that includes the text in a more OCR compatible font, as in image 1302, shown in FIG. 13.

Figure 14:
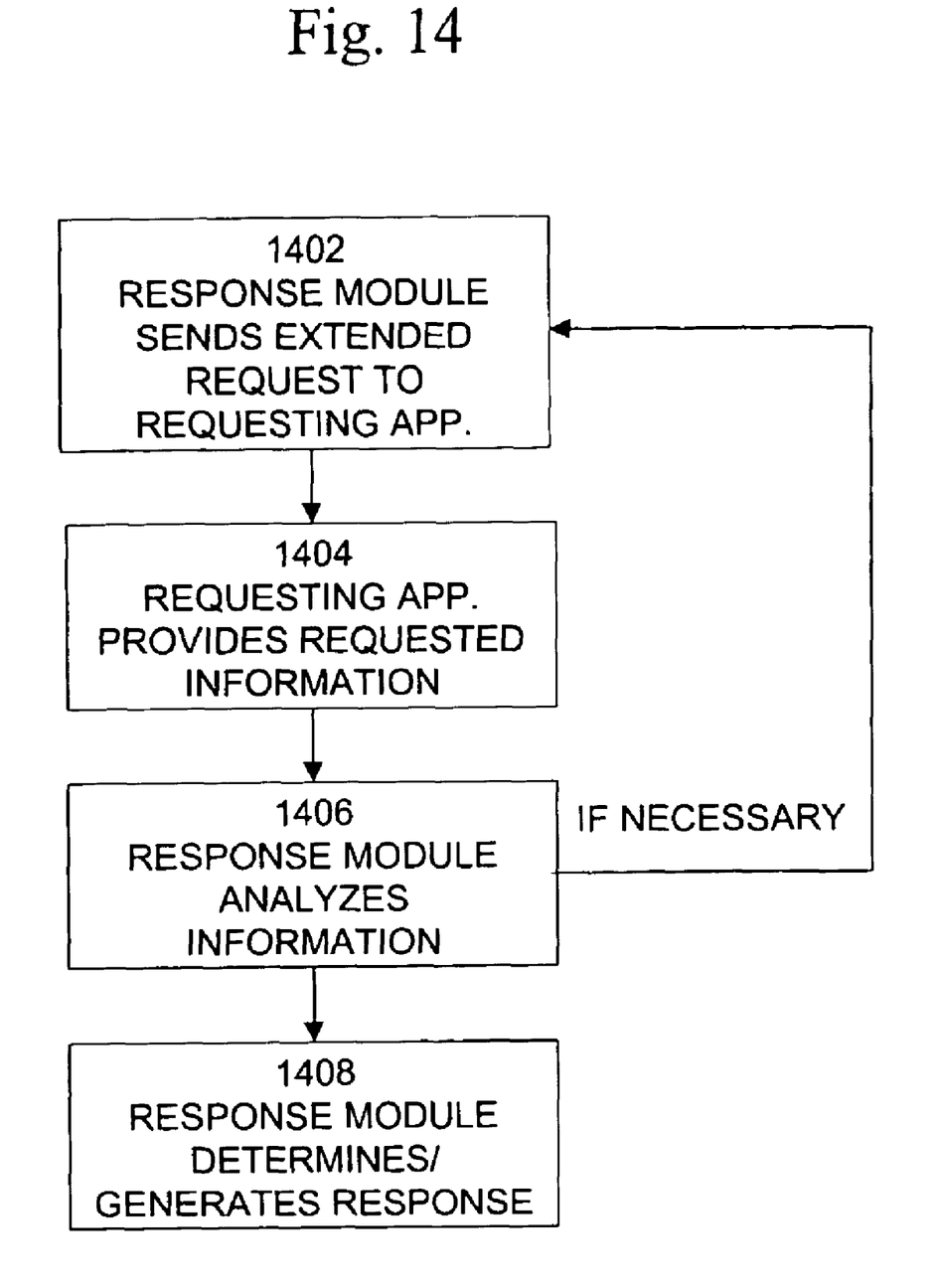
FIG. 14 is a data flow diagram of a process of a further embodiment of the present invention.

In a further embodiment of the present invention, the owning application and the requesting application may have further communications regarding the data to be provided, as shown in FIG. 14. The process shown in FIG. 14 may be considered an enhancement to step 258 of FIG. 2b. In step 1402, after the response module has been invoked in step 256 of FIG. 2b, the response module sends an extended request to the requesting application. The extended request is for information which must be provided to the response module in order for the response module to generate the proper resolution, or which is advantageous to be provided to the response module in order for the response module to generate an improved resolution. For example, the response module may request information regarding "why" the requesting application wants the data, in the sense of the use the requesting application will make of the requested data. Likewise, the response module may request information about the identity of the requesting application or about format or attributes of the data desired by the requesting application.

In step 1404, the requesting application provides the information requested by the response module in step 1402. In step 1406, the response module analyzes the information received from the requesting application to determine if any additional information is necessary. If additional information is necessary, the response module may repeat steps 1402–1406, in order to obtain the additional information from the requesting application. Once the response module has all the necessary information, or is unable to obtain any additional information, then, in step 1408, the response module determines what action to take and generates a resolution using the received information. If the response module is unable to obtain necessary information, an error may be generated, or alternatively, a default resolution or a resolution based on at least some default information may be generated.

Figure 15:
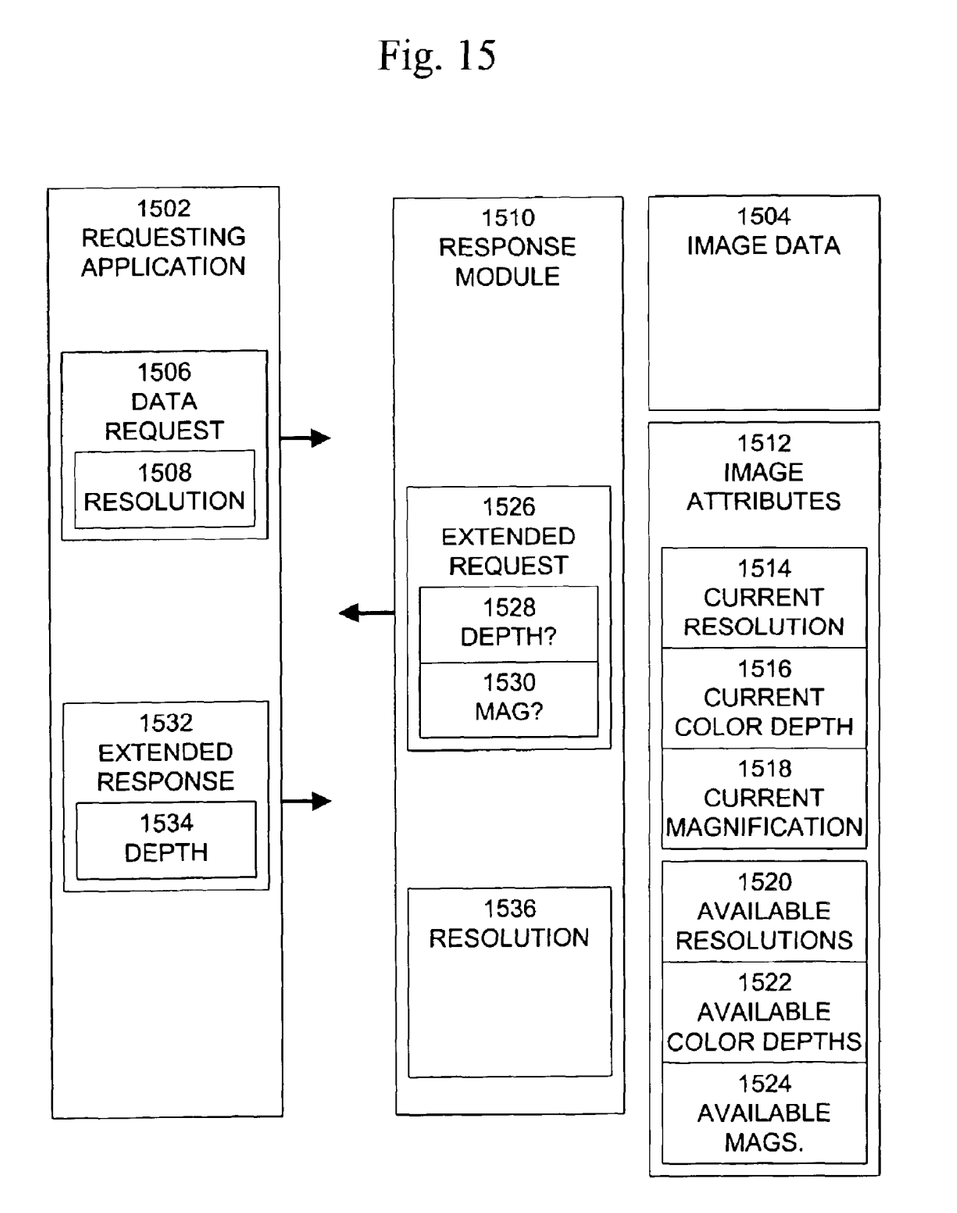
FIG. 15 is a data flow diagram of an example of processing shown in FIG.

An example of the data flow that occurs in the processes shown in FIGS. 2b and 14 is shown in FIG. 15. Requesting application 1502 requests access to data 1504. The data request 1506 may include additional information, such as, in this example, an indication 1508 of the resolution desired by requesting application 1502. As shown in FIG. 2b, the data request is routed to response module 1510. Response module 1510 may examine data 1504 and attributes 1512, in order to determine an action to take in response to data request 1506. In this example, data 1504 is an image and attributes 1512 are therefore image attributes. Attributes 1512 include attributes such as the current resolution 1514, the current color depth 1516, and the current magnification 1518 at which the image is being displayed, as well as available resolutions 1520, available color depths 1522, and available magnifications 1524, at which the image data may be provided.

In the example of FIG. 15, response module 1510 determines that three attributes, resolution, color depth, and magnification, may be specified for the image data to be provided and that only one attribute, resolution, has been specified by requesting application 1502. Response module 1510 then sends an extended request 1526 for additional information regarding the unspecified attributes to requesting application 1502. In this example, extended request 1526 includes a request for a color depth specification 1528 and a request for a magnification specification 1530. Requests 1528 and 1530 may include information relating to the current settings 1516 and 1518 of these attributes and/or information relating to available settings 1522 and 1524 of these attributes.

The requesting application receives extended request 1526 and may ignore the extended request or respond to it. In the example of FIG. 15, requesting application 1502 responds to extended request 1526 by sending extended response 1532 to response module 1510. Extended response 1532 only includes a specification of color depth 1534 and not a specification of magnification. Response module 1510 may respond to this in several ways. Response module 1510 may return an error. Response module 1510 may repeat steps 1402–1406 of FIG. 14 and send one or more additional extended requests to requesting application 1502 in an attempt to obtain the unspecified information. Or, response module 1510 may use a default value, such as the current magnification 1518. Once response module 1510 has all necessary information, it generates resolution 1536, which is the image data requested by requesting application 1502, modified as specified.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for providing access to displayable data comprising the steps of:

receiving a request for the displayable data of an owning application of a first process, the request received from a second process;

invoking a callback module to detect and advise the owning application the identity of another application accessing the displayed data;

generating, at the first process, a resolution to the request for the displayable data received from the second process; the resolution based on displayable image data for the first process and displayed in an owning application window contained in a display memory wherein the step of generating the resolution comprises the steps of:

transmitting a request for additional information relating to the request for data from the first process to the second process;

receiving a response to the request for additional information from the second process;

generating, at the first process, a resolution to the request for data received from the second process based on the response to the request for additional information received from the second process; and transmitting the generated resolution for the displayed data based on the request from the first process to the second process.

2. The method of claim 1 wherein the requested data is protected data and the received resolution comprises a modified version of the protected data.

3. The method of claim 2, wherein the modified version of the data comprises data substituted for at least a portion of the protected data or data augmenting the protected data.

4. The method of claim 3, wherein the data substituted for at least a portion of the protected data comprises a pattern or a message indicating where the protected data would have been displayed.

5. The method of claim 3, wherein the data augmenting the protected data comprises a copyright notice.

6. The method of claim 1, wherein the requested data of another process is data that is not being displayed and the received resolution comprises the requested data of the other process.

7. The method of claim 1, wherein the requested data does not exist and the received resolution comprises a generated version of the requested data.

8. The method of claim 1, wherein the requesting step comprises the step of transmitting information relating to the request for displayable data to the first process and wherein the received resolution is based on the information relating to the request for the displayable data.

9. The method of claim 8, wherein the information relating to the request for data identifies a process requesting the data and the received resolution is based on the identified process.

10. The method of claim 8, wherein the information relating to the request for data indicates a use to be made of the data and the received resolution is based on the indicated use.

11. The method of claim 1, wherein the requested data comprises image data.

12. The method of claim 11, wherein the received resolution comprises image data having a different color depth than the requested data.

13. The method of claim 11, wherein the received resolution comprises image data having a different pixel resolution than the requested data.

14. The method of claim 11, wherein the received resolution comprises image data that is not the requested data.

15. The method of claim 1, wherein the requested data comprises an image of text displayed in a first font and the received resolution comprises an image of the text displayed in a second font.

16. The method of claim 1, wherein the received response to the request for additional information comprises information identifying a process requesting the data.

17. The method of claim 1, wherein the received response to the request for additional information comprises information indicating a use to be made of the data.

18. The method of claim 1, wherein the received response to the request for additional information comprises information relating to attributes of the data.

19. A system for providing access to displayable data comprising:

means for receiving a request for the displayable data of an owning application of a first process, the request received from a second process;

invoking detecting means to detect and advise the owning application the identity and information about another application requesting access to the displayed data;

means for generating, at the first process, a resolution to the request for data received from the second process; the resolution based on displayable image data and displayed in an owning application window contained in a display memory wherein the means for generating the resolution comprises:

means for transmitting a request for additional information relating to the request for data from the first process to the second process;

means for receiving a response to the request for additional information from the second process; and means for generating, at the first process, a resolution to the request for data received from the second process based on the response to the request for additional information received from the second process; and means for transmitting the generated resolution for the displayable data based on the request from the first process to the second process.

20. The system of claim 19, wherein the requested data is protected data and the received resolution comprises a modified version of the protected data.

21. The system of claim 19, wherein the modified version of the data comprises data substituted for at least a portion of the protected data or data augmenting the protected data.

22. The system of claim 21, wherein the data substituted for at least a portion of the protected data comprises a pattern or a message indicating where the protected data would have been displayed.

23. The system of claim 21, wherein the data augmenting the protected data comprises a copyright notice.

24. The system of claim 19, wherein the requested data is data that is not being displayed and the received resolution comprises the requested data.

25. The system of claim 19, wherein the requested data does not exist and the received resolution comprises a generated version of the requested data.

26. The system of claim 19, wherein the requesting means comprises the means for transmitting information relating to the request for data to the first process and wherein the received resolution is based on the information relating to the request for data.

27. The system of claim 26, wherein the information relating to the request for data identifies a process requesting the data and the received resolution is based on the identified process.

28. The system of claim 26, wherein the information relating to the request for data indicates a use to be made of the data and the received resolution is based on the indicated use.

29. The system of claim 19, wherein the requested data comprises image data.

30. The system of claim 29, wherein the received resolution comprises image data having a different color depth than the requested data.

31. The system of claim 29, wherein the received resolution comprises image data having a different pixel resolution than the requested data.

32. The system of claim 29, wherein the received resolution comprises image data that is not the requested data.

33. The system of claim 19 wherein the requested data comprises an image of text displayed in a first font and the received resolution comprises an image of the text displayed in a second font.

34. The system of claim 19, wherein the received response to the request for additional information comprises information identifying a process requesting the data.

35. The system of claim 19, wherein the received response to the request for additional information comprises information indicating a use to be made of the data.

36. The system of claim 19, wherein the received response to the request for additional information comprises information relating to attributes of the data.

37. A computer program product for restricting access to displayable data, comprising:

a computer readable medium;

computer program instructions, recorded on the computer readable medium, executable by a processor, for performing the steps of:

receiving a request for the displayable data of an owning application of a first process, the request received from a second process;

generating, at the first process, a resolution to the request for the displayable data received from the second process, the resolution based on displayable image data for the first process and displayed in an owning application window contained in a display memory wherein the step of generating the resolution comprises the steps of:

transmitting a request for additional information relating to the request for data from the first process to the second process;

receiving a response to the request for additional information from the second process; and generating, at the first process, a resolution to the request for data received from the second process based on the response to the request for additional information received from the second process; and transmitting the generated resolution for the displayable data based on the request from the first process to the second process.

38. The computer program product of claim 37, wherein the requested data is protected data and the received resolution comprises a modified version of the protected data.

39. The computer program product of claim 38, wherein the modified version of the data comprises data substituted for at least a portion of the protected data or data augmenting the protected data.

40. The computer program product of claim 39, wherein the data substituted for at least a portion of the protected data comprises a pattern or a message indicating where the protected data would have been displayed.

41. The computer program product of claim 39, wherein the data augmenting the protected data comprises a copyright notice.

42. The computer program product of claim 37, wherein the requested data is data that is not being displayed and the received resolution comprises the requested data.

43. The computer program product of claim 37, wherein the requested data does not exist and the received resolution comprises a generated version of the requested data.

44. The computer program product of claim 37, wherein the requesting step comprises the step of transmitting information relating to the request for data to the first process and wherein the received resolution is based on the information relating to the request for data.

45. The computer program product of claim 44, wherein the information relating to the request for data identifies a process requesting the data and the received resolution is based on the identified process.

46. The computer program product of claim 44, wherein the information relating to the request for data indicates a use to be made of the data and the received resolution is based on the indicated use.

47. The computer program product of claim 37 wherein the requested data comprises image data.

48. The computer program product of claim 47, wherein the received resolution comprises image data having a different color depth than the requested data.

49. The computer program product of claim 47, wherein the received resolution comprises image data having a different pixel resolution than the requested data.

50. The computer program product of claim 47, wherein the received resolution comprises image data that is not the requested data.

51. The computer program product of claim 37, wherein the requested data comprises an image of text displayed in a first font and the received resolution comprises an image of the text displayed in a second font.

52. The computer program product of claim 37, wherein the received response to the request for additional information comprises information identifying a process requesting the data.

53. The computer program product of claim 37, wherein the received response to the request for additional information comprises information indicating a use to be made of the data.

54. The computer program product of claim 37, wherein the received response to the request for additional information comprises information relating to attributes of the data.

55. A method for providing access to displayable data of an owning application in a computer system, comprising:

storing displayable image data from an owning application, a display memory of the computer system;

displaying image data of an owning application in a window of a display;

requesting access to the displayed image data by a requesting application;

detecting access to the displayable information by the requesting application;

invoking a callback module to call the owning application to request a resolution to the access by the requesting module;

invoking a response module by the owning application to determine an action(s) to take with regard to the request; and generating a resolution by the response module to the request based upon factors including the type of data involved with the request; the application requesting access; the status of the data of the availability of the data.

56. A method for providing access to displayable data from an owning application in a computer system comprising:

storing displayable image data of an owning application in a display memory of the computer system;

requesting access to the stored displayable image data of an owning application by a requesting application;

detecting the request for access to the stored displayable image data of the owning application and providing the owning application the identity and information about another application requesting access to the displayed data;

invoking a response module by the owning application in response to detecting the request to determine the action to take with regard to the request by the requesting application;

sending an extended request to the requesting application by the response module;

providing requested information to the extended request by the requesting application;

analyzing the requested information by the response module;

requesting further information from the requesting application by the response module if necessary, and generating a resolution to the request by the response module.

57. A method for providing access to displayable data of an owning application in a computer system comprising:

storing displayable image data of an owning application in a display memory of the computer system;

requesting access to the displayable data of the owning application by a requesting application;

including additional information in the request related to form and content of the displayable image data;

routing the request to a response module invoked by the owning application;

examining the displayable image data and attributes to determine an action to take in response to the request;

determining the attributes of the displayable image data to respond to the request;

sending an extended request for additional information regarding unspecified attributes to the request;

receiving the extended request by the requesting application;

sending an extended response to the response module;

sending an extended request for information by the response module if necessary to generate a resolution for the image data requested by the requesting application; and transmitting the generated resolution to the request by the requesting application.

* * * * *